(12) United States Patent
Pawlakowitsch et al.

(10) Patent No.: US 10,247,251 B2
(45) Date of Patent: Apr. 2, 2019

(54) COUPLING DEVICE

(71) Applicant: ZF Friedrichshafen AG, Friedrichshafen (DE)

(72) Inventors: Juri Pawlakowitsch, Horgenzell (DE); Felix Merz, Reichenau (DE); Peter Ziemer, Tettnang (DE); Raffael Kuberczyk, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 293 days.

(21) Appl. No.: 15/054,377

(22) Filed: Feb. 26, 2016

(65) Prior Publication Data

US 2016/0281794 A1 Sep. 29, 2016

(30) Foreign Application Priority Data

Feb. 27, 2015 (DE) .......................... 10 2015 203 571

(51) Int. Cl.
*F16D 11/14* (2006.01)
*B60K 6/36* (2007.10)
(Continued)

(52) U.S. Cl.
CPC ............... *F16D 11/14* (2013.01); *B60K 6/36* (2013.01); *B60K 6/38* (2013.01); *F16D 21/00* (2013.01); *F16D 21/02* (2013.01); *F16H 63/08* (2013.01); *F16H 63/30* (2013.01); *F16D 2011/002* (2013.01); *F16H 2063/3093* (2013.01)

(58) Field of Classification Search
CPC .......... F16D 21/02; F16D 21/06; F16D 21/08; F16D 2011/002; F16D 11/14; F16D 11/08
See application file for complete search history.

(56) References Cited

U.S. PATENT DOCUMENTS 5,273,499 A * 12/1993 Friedl .................... F16D 11/08
192/108
8,651,999 B2 2/2014 Wust
(Continued)

FOREIGN PATENT DOCUMENTS

DE 10 2006 055541 A1 9/2008
DE 10 2008 011080 A1 8/2009
(Continued)

*Primary Examiner* — William Kelleher
*Assistant Examiner* — Gregory T Prather
(74) *Attorney, Agent, or Firm* — Dority & Manning, P.A.

(57) ABSTRACT

A coupling device (K) has a first positive-locking clutch (K0), a second positive-locking clutch (K1), an axially fixed first shaft (W1), an axially fixed second shaft (W2), a connecting shaft (WV) and an actuator (AK). The first shaft (W1), the second shaft (W2) and the connecting shaft (WV) are arranged coaxially to each other. By closing the first clutch (K0), a torque-proof connection between the first shaft (W1) and the connecting shaft (WV) is established, and by closing the second clutch (K1), a torque-proof connection between the connecting shaft (WV) and the second shaft (W2) is established. The actuator through axial displacement of the connecting shaft (WV), shifts both the first clutch (K0) and the second clutch (K1) between an engaged state and a disengaged state, such that the connecting shaft (WV) is movable to a multitude of axial positions to achieve different engaged states of the clutches.

17 Claims, 12 Drawing Sheets

(51) Int. Cl.
  *B60K 6/38*   (2007.10)
  *F16D 21/02*  (2006.01)
  *F16D 21/00*  (2006.01)
  *F16H 63/08*  (2006.01)
  *F16H 63/30*  (2006.01)
  *F16D 11/00*  (2006.01)

(56) References Cited

U.S. PATENT DOCUMENTS

| | | | |
|---|---|---|---|
| 9,340,101 B2 | 5/2016 | Meiβner et al. | |
| 2008/0096717 A1* | 4/2008 | Houle | B60K 6/387 |
| | | | 477/5 |
| 2009/0084652 A1* | 4/2009 | Kummer | F16D 13/683 |
| | | | 192/113.1 |
| 2010/0094519 A1* | 4/2010 | Quehenberger | B60K 17/35 |
| | | | 701/69 |
| 2014/0026699 A1* | 1/2014 | Kunze | F16D 11/14 |
| | | | 74/373 |
| 2014/0262671 A1* | 9/2014 | Schoolcraft | F16D 11/08 |
| | | | 192/69.8 |
| 2015/0240879 A1* | 8/2015 | Takagi | F16D 3/185 |
| | | | 464/154 |

FOREIGN PATENT DOCUMENTS

| | | |
|---|---|---|
| DE | 10 2010 012667 A1 | 9/2011 |
| DE | 10 2012 018206 A1 | 5/2014 |
| DE | 10 2014 201254 A1 | 8/2015 |
| EP | 1 628 848 B1 | 9/2012 |
| WO | WO 2013/183164 A1 | 12/2013 |

* cited by examiner

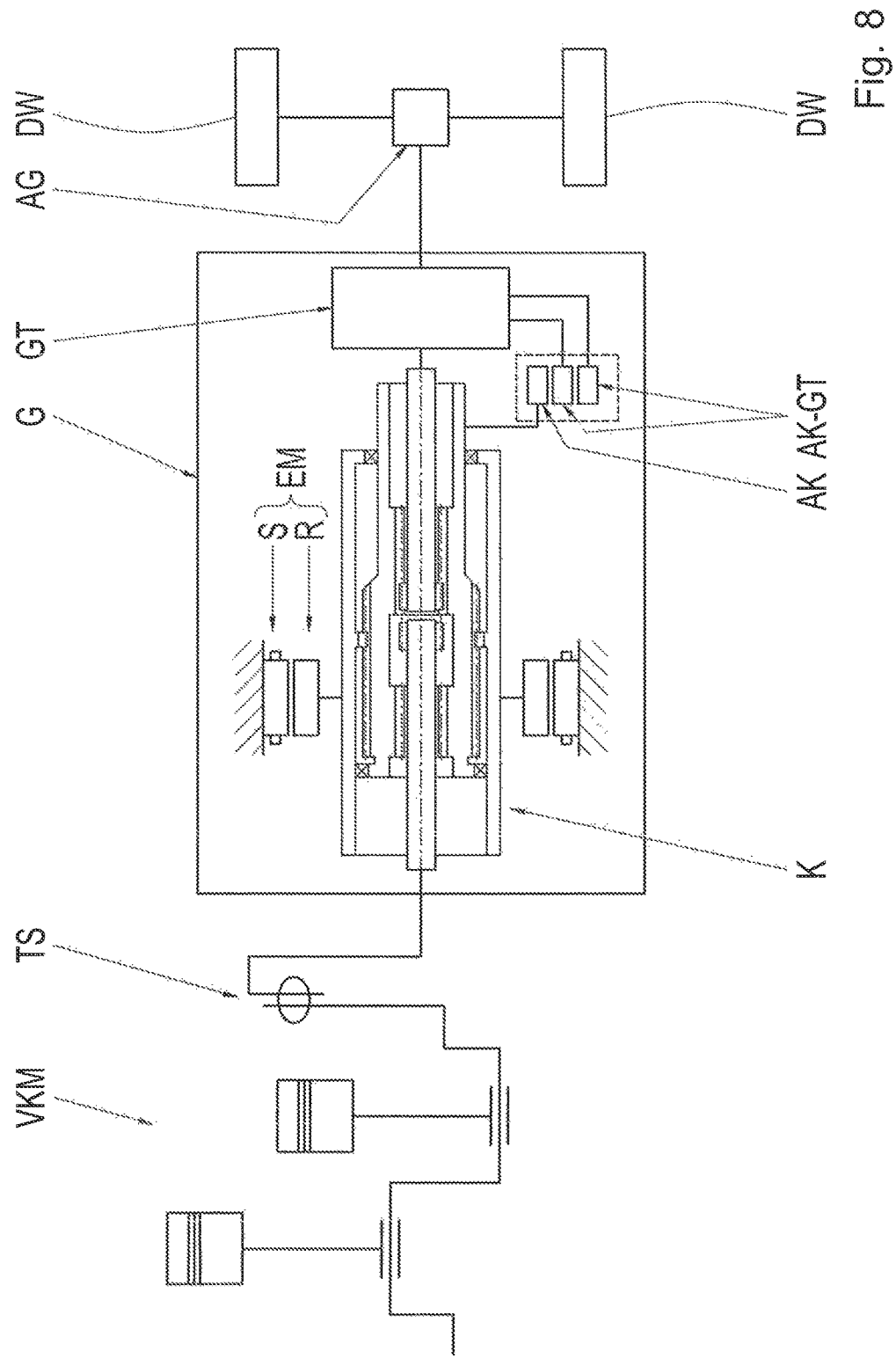

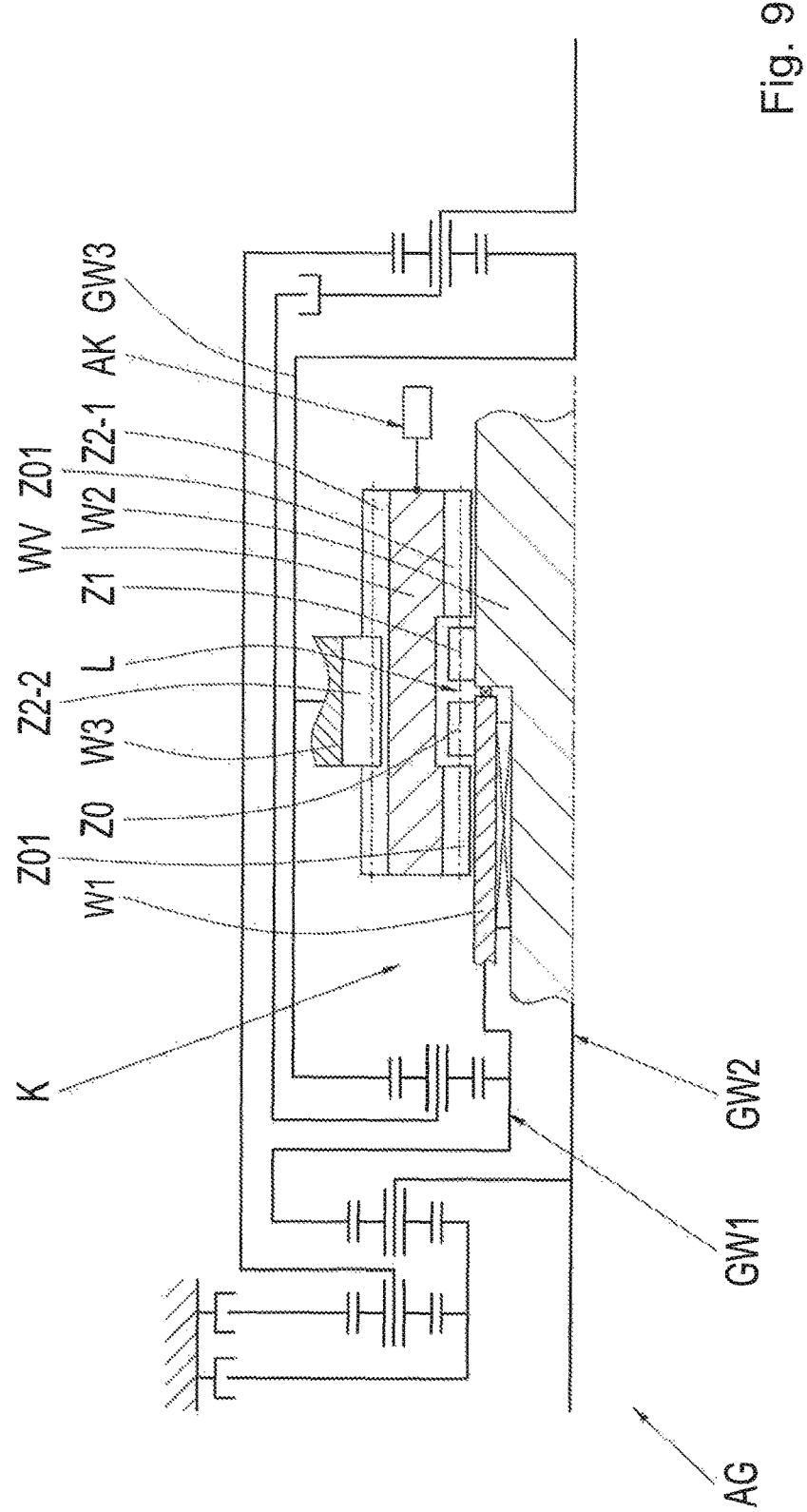

COUPLING DEVICE

The invention relates to a coupling device with at least two positive-locking clutches, a first shaft, a second shaft, a connecting shaft and an actuator.

Positive-locking clutches, for example claw couplings, are well-known in the state of the art, and in a closed state establish a connection by means of positive locking. In an open state, positive-locking clutches are distinguished by having lower drag losses than force-fitting clutches, whereby positive-locking clutches are increasingly being used in automotive transmissions.

Patent EP 1 628 848 B1 describes a device with a coupling arrangement for a hybrid drive of a vehicle, whereas the coupling arrangement connects an output shaft of a first electric motor to the output shaft of a motor and to the output shaft of a second electric motor. For this purpose, the coupling arrangement includes a movable disk, which is connected to the output shaft of the first electric motor. An actuation mechanism can move the movable disk between three different positions, by which the output shaft of the first electric motor can be connected either to the output shaft of the motor, or to the output shaft of the second electric motor, or can be brought into a free-running position. The coupling arrangement may consist of a claw coupling.

Patent application DE 10 2006 055 541 A1 describes a hybrid drive system for a vehicle, whereas a first clutch is arranged, in the manner of a positive-locking clutch, between an internal combustion engine and an electric motor. The positive-locking clutch is formed as a sliding sleeve system, whereas a first sliding sleeve can be brought into engagement with a component allocated to the internal combustion engine, and a second sliding sleeve can be brought into engagement with a rotor section of the electric motor. A second clutch is arranged between the electric motor and a transmission; this is formed as a conventionally designed starting and separating coupling.

Patent application WO 2013/183164 A1 describes a control device for a hybrid vehicle, with which the driving mode is selectable with the aid of a claw coupling. The claw coupling comprises a first active section that is allocated to a first electric motor, and a second active section that is allocated to a ring gear. Thereby, the claw coupling features a total of three active positions, which gives rise to different connections.

However, the solutions known in the state of the art enable only a selection of possible drive train functions, or require an additional actuator system for actuating a second clutch. Therefore, it is the task of the invention to provide a coupling device that is distinguished by a simple structure, while enabling a variety of connection options. The coupling device is to be suitable for a variety of applications, for example for the use in the drive train of a hybrid vehicle, or generally as a coupling within a transmission.

The task is solved by the characteristics of claim 1. Advantageous arrangements arise from the sub-claims, the description and the figures.

The coupling device comprises a first positive-locking clutch, a second positive-locking clutch, an axially fixed first shaft, an axially fixed second shaft, a connecting shaft and an actuator. The first shaft, second shaft and connecting shaft are arranged coaxially to each other, and are configured to rotate around the same rotational axis. Thereby, a production-related axial offset is not taken into account.

By closing the first positive-locking clutch, a torque-proof connection between the first shaft and the connecting shaft is established. By closing the second positive-locking clutch, a torque-proof connection between the connecting shaft and the second shaft is established. The actuator is configured to, through the axial displacement of the connecting shaft, shift both the first and the second positive-locking clutches between an engaged state and a disengaged state. In an engaged state, a torque-proof connection between the participating shafts is established. In a disengaged state, the rotational speeds of the participating shafts may differ. In a first axial position of the connecting shaft, the first clutch is in an engaged state, while the second clutch is in a disengaged state. In a second axial position of the connecting shaft, both the first and the second clutches are in a disengaged state. In a third axial position of the connecting shaft, the first clutch is in a disengaged state, while the second clutch is in an engaged state.

In accordance with the invention, in a fourth axial position of the connecting shaft, both the first clutch and the second clutch are in an engaged state, whereas, through the axial displacement of the connecting shaft, the following sequences of the axial positions of the connecting shaft can be achieved:

fourth axial position, first axial position, second axial position, third axial position; or
  first axial position, second axial position, third axial position, fourth axial position.

With the application of the coupling device in the drive train of a hybrid vehicle, with which, through the first clutch, an internal combustion engine (for example) is connectable to an electric motor and through the second clutch, the electric motor is connectable to a transmission, various operating modes, which are described below, can be enabled with a single actuator. Thereby, the rotor of the electric motor is connected in a torque-proof manner to the connecting shaft. Of course, the rotor may be firmly fixed in an axial manner, whereas axial mobility can be realized through a smooth-running synchronization toothing between the connecting shaft and a shaft connected to the rotor.

With a closed first clutch and an open second clutch, the charging of an electrical energy storage device through internal combustion engine mode and the generator mode of the electric motor when the vehicle is at a standstill is possible. If the transmission features an additional electric motor, serial hybrid mode can also take place. The internal combustion engine can be started by the electric motor during driving mode, without reacting upon the output. With an open first clutch and a closed second clutch, a gear change of the transmission can be assisted by the electric motor, or, depending on the configuration of the transmission even first enabled by the electric motor, since the sluggish drive assembly is no longer operatively coupled to the drive train. In addition, a purely electric driving mode is possible in different gears of the transmission, with which the electric motor connected to the connecting shaft drives the vehicle. With a closed first and second clutch, the internal combustion engine acts directly on the transmission. This enables a pure internal combustion engine mode along with a parallel hybrid mode.

If there is to be a switch between internal combustion engine mode or parallel hybrid mode into electric driving mode, the connecting shaft must be moved from the fourth axial position into the third axial position. This is possible with one of the sequences in accordance with the invention, directly and without an intermediate position. Therefore, this sequence of the axial positions of the intermediate shaft is particularly suitable for hybrid vehicles, which have a high share of internal combustion engine mode and parallel hybrid mode, and regularly use electric driving mode, for example, so-called "plug-in-hybrid" vehicles.

If the hybrid vehicle features an architecture in which there is a regular switching between a serial hybrid mode and a parallel hybrid mode, the other sequence in accordance with the invention of the axial positions of the connecting shaft is advantageous. Upon a change between such operating modes, the connecting shaft of the fourth axial position must be moved into the first axial position.

Preferably, a first claw toothing is arranged on the first shaft. Thereby, the first claw toothing is preferably configured at the free end of the first shaft, which is turned towards the second shaft. A second claw toothing is arranged at the second shaft. The second claw toothing is preferably formed at the free end of the second shaft, which is turned towards the first shaft. A third claw toothing formed at the connecting shaft. In the first axial position of the connecting shaft, the third claw toothing is only in engagement with the first claw toothing. In the second axial position of the connecting shaft, the third claw toothing is not in engagement with either the first or the second claw toothing. In the third axial position of the connecting shaft, the third claw toothing is in engagement only with the second claw toothing. In the fourth axial position of the connecting shaft, the third claw toothing is in engagement with both the first and the second claw toothings.

Preferably, the first and second claw toothings are formed as external toothings, while the third claw toothing is formed as an internal toothing. Accordingly, the connecting shaft is formed as a hollow shaft and, depending on the axial position of the connecting shaft, encloses at least sections of the first shaft and/or the second shaft. This results in good accessibility to the connecting shaft, by which the connection of the actuator to the connecting shaft is facilitated. Of course, the first and second claw toothings may be formed as internal toothings, while the third claw toothing is formed as an external toothing. In this case, the connecting shaft would be arranged within the first and second shafts formed as hollow shafts.

Preferably, the third claw toothing features at least one axially extending gap in the toothing. At least in the second axial position of the connecting shaft, the first and second claw toothings are spatially located in this at least one gap, by which the first and second claw toothings are not in engagement in this axial position of the connecting shaft with the third claw toothing. By varying the arrangement of the at least one gap, the sequence of the varying axial position and its effects can be changed. In this manner, different variants of the connecting shaft can be produced with little manufacturing effort.

According to one arrangement, in a fifth axial position of the connecting shaft, both the first clutch and the second clutch are in an engaged state, in which the third claw toothing is engaged with the first and second claw toothings. Thereby, through the axial displacement of the connecting shaft, the following sequence of the axial positions of the connecting shaft can be achieved: fourth axial position, first axial position, second axial position, third axial position, fifth axial position. Thereby, the shifting state of the first and second clutches in the fifth axial position corresponds to the shifting state in the fourth axial position, but this position is achieved at a different location in the sequence of the axial positions. Through this arrangement, for the use of the coupling device in the drive train of a hybrid vehicle, flexibility when changing between the operating modes is further increased. This is because a direct switching process between one shifting state, in which only one of the first and second clutches is now closed, and another shift state, in which both the first and the second clutches are closed, is now possible. A direct shifting process is thereby understood as a shifting process, with which the shifting state can be produced without an intermediate shifting state.

Preferably, the connecting shaft is connected in a torque-proof manner to an axially fixed third shaft through a third positive-locking clutch. A fourth claw toothing is formed at the connecting shaft, and a fifth claw toothing is formed at the third shaft. In the first to fourth and (if applicable) fifth axial position of the connecting shaft, the fourth claw toothing is in engagement with the fifth claw toothing, whereas the fourth and fifth claw toothings are not in engagement in a sixth axial position of the connecting shaft. In other words, the third clutch is engaged in the first to fourth and (if applicable) fifth axial position of the connecting shaft, and is disengaged only in the sixth axial position of the connecting shaft. In this manner, with the use of the coupling device in the drive train of a hybrid vehicle, the number of operating modes is further increased if the rotor of the electric motor is constantly connected in a torque-proof manner to the third shaft instead of the connecting shaft. By selecting the sixth axial position of the connection shaft, the electric motor is decoupled from the rest of the drive train. Thereby, for example, in internal combustion engine mode, the drag torque of the electric motor can be decoupled from the drive train, by which the efficiency of the drive train is improved. If the electric motor is formed as a permanently energized synchronous machine, because of the decoupling, the cogging torque also does not act on the drive train. The electric motor may also be designed at a smaller maximum rotational speed, which is less than the maximum arising rotational speed of the connecting shaft. This reduces the manufacturing costs of the electric motor.

Preferably, the sixth axial position of the connecting shaft is arranged in one of the following sequences of the axial positions of the connecting shaft:

sixth axial position, fourth axial position, first axial position, second axial position, third axial position, or first axial position, second axial position, third axial position, fourth axial position, sixth axial position, or fifth axial position, first axial position, second axial position, third axial position, fourth axial position, sixth axial position, or sixth axial position, fifth axial position, first axial position, second axial position, third axial position, fourth axial position.

Thus, the sixth axial position is always selectable starting from a shifting position in which both the first and the second clutches are closed.

According to one arrangement of the invention, the fourth claw toothing is likewise not engaged with the fifth claw toothing in a seventh axial position of the connecting shaft, whereas the seventh axial position of the connecting shaft is arranged at the following location in the sequence of the axial positions of the connecting shaft: seventh axial position, fifth axial position, first axial position, second axial position, third axial position, fourth axial position, sixth axial position. Thus, the flexibility of the available operating modes of the hybrid drive train is further increased, since, starting from both axial positions of the connecting shaft, in which the first and the second clutches are closed, the electric motor can be decoupled.

Preferably, the connecting shaft is designed as a hollow shaft, whereas the third claw toothing is formed as an internal toothing and the fourth claw toothing is formed as an external toothing. Accordingly, the connecting shaft is formed as a hollow shaft and, depending on the axial position of the connecting shaft, encloses at least sections of the first shaft and/or the second shaft. This results in a good accessibility to the connecting shaft, by which the connection of the actuator to the connecting shaft is facilitated.

According to one arrangement of the invention, slide bearings are arranged between the third shaft and the connecting shaft. Thereby, the third shaft can be supported in the radial direction at the connecting shaft, by which a separate bearing system is eliminated.

Preferably, the actuator is formed by an electromechanical device. This may be, for example, an electric motor, the rotational movement of which is converted into an axial movement by means of a suitable transmission. Thereby, a self-locking transmission, for example a spindle transmission, is preferably used. With a suitable design, the currently selected axial position of the connecting shaft may be locked through the self-locking. The electromechanical device may also be realized by a spring-loaded armature with a coil, whereas suitable locking mechanisms may also be used. In alternative embodiments, the actuator may also be formed by one or more electromagnetic, hydraulic or pneumatic devices.

Preferably, the axial movement of the actuator is transferred to the connecting shaft by means of a shift rod and a shift fork, or alternatively by means of a shift drum and a shift fork. Thereby, in a simple manner, there can be a compensation for a difference in rotational speeds between the connecting shaft and the actuator system.

The invention also relates to a drive train of a motor vehicle with a coupling device in accordance with the invention and an electric motor with a torque-proof stator and a rotatably mounted rotor. For this purpose, the first shaft of the coupling device is connected through a torsional vibration damper in a torsionally flexible manner to a drive assembly, which is formed, for example, by an internal combustion engine. The second shaft of the coupling arrangement is connected to a shaft of a transmission in a torque-proof or torsionally flexible manner, which forms an interface to a change of transmission ratio section of the transmission, in particular with an input shaft of the transmission. The rotor of the electric motor is constantly connected in a torque-proof manner to the connecting shaft or to the third shaft. Thereby, a drive train is provided, which is characterized in particular by its variability of operating modes. Through the positive-locking clutches, the drive train also features good mechanical efficiency. This is primarily advantageous in the application in the motor vehicle. Given the single required actuator, the drive train is inexpensive to manufacture for the first, second and (if applicable) third clutches. Preferably, the coupling device is a component of the transmission, and is thus integrated into the transmission.

The invention also relates to a transmission with a coupling device in accordance with the invention. According to one arrangement, the change of transmission ratio section of the transmission features a multitude of shifting elements, the selective actuation of which brings about a change in the transmission ratio relationship between two shafts of the transmission. The actuator, which is provided for the actuation of the first and second and (if applicable) third clutches, is thereby in operative connection with the actuator system for actuating the shifting elements of the change of transmission ratio section. This actuator system may also actuate only individual or even only one of the shifting elements of the change of transmission ratio section. In doing so, the synergy effects of the two actuator systems can be used.

The represented coupling device is not limited to use in a drive train between the internal combustion engine, the electric motor and the transmission. Generally, the coupling device in accordance with the present invention may be employed where two or three shafts are to be connectable to each other in a defined sequence, individually or together, in the described sequence of the axial positions of the connecting shaft. The coupling device may be used in particular in a transmission for a motor vehicle, whereas the first shaft is connected in a torque-proof manner to a first transmission shaft, the second shaft is connected in a torque-proof manner to a second transmission shaft, and the connecting shaft is connected in a torque-proof manner to a third transmission shaft. Primarily with automatic transmissions based on planetary gear sets, the case may arise that the three transmission shafts are to be connectable in the manner described above, individually or together. Through the represented coupling device, this requirement can be implemented in the smallest installation space by a single actuator, by which the need for installation space of such a transmission can be reduced. Alternatively, an arrangement with which the third transmission shaft is connected in a torque-proof manner to the third shaft of the coupling device, instead of the connecting shaft, is conceivable.

Embodiments of the invention are described in detail through the attached figures.

FIGS. 1A-1D schematically show a coupling device in four different positions according to a first sequence.

FIGS. 2A-2D schematically show a coupling device in four different positions according to a second sequence.

FIGS. 3A-3C schematically show a coupling device of a second arrangement in three different positions according to a first sequence.

FIGS. 4A-4C schematically show a coupling device of a second arrangement in three different positions according to a second sequence.

FIG. 5 schematically shows a coupling device of a third arrangement.

FIG. 8 shows a drive train of a hybrid vehicle according to a third embodiment.

FIG. 9 shows a sectional view of an automatic transmission for a motor vehicle.

FIG. 1 schematically shows a coupling device K in four different positions according to a first sequence. The coupling device K features a first shaft W1, a second shaft W2, a connecting shaft WV and an actuator AK. The first shaft W1, the second shaft W2 and the connecting shaft WV are arranged coaxially to each other. At the outer diameter of the first shaft W1, a first claw toothing Z0 is formed as an external toothing. At the outer diameter of the second shaft W2, a second claw toothing Z1 is formed as an external toothing. At an inner diameter of the connecting shaft WV, a third claw toothing Z01 is formed as an internal toothing. The third claw toothing Z01 features a gap L. In the gap L, the third claw toothing Z01 is interrupted.

The first claw toothing Z0 and the third claw toothing Z01 together form a first positive-locking clutch K0. The second claw toothing Z1 and the third claw toothing Z01 together form a second positive-locking clutch K1. The two couplings K0, K1 accordingly feature a common element, specifically, the connecting shaft WV with the third claw toothing Z01 formed thereon.

The actuator AK is configured to shift the connecting shaft WV in the axial direction, and producing such different shifting states of the first and second clutches K0, K1. The figure only indicates the actuator AK and its connection to the connecting shaft WV. The actuator AK could be formed, for example, as an electromechanical actuator, which converts a rotational movement of an electric motor, for example by means of a spindle transmission in an axial movement. The connection of the actuator AK to the connecting shaft WV could include a shift fork for compensating for a speed difference between the actuator AK and the connecting shaft WV. The specialist will employ appropriate solutions, when required.

FIG. 1 presents the coupling device K in four different axial positions of the connecting shaft WV. For better clarity, the axial positions of the connecting shaft WV are described below, whereas the nomenclature is maintained in the represented application.

In a first axial position of the connecting shaft WV, the first clutch K0 is in an engaged state, and the second clutch K1 is in a disengaged state. In a second axial position of the connecting shaft WV, both the first clutch K0 and the second clutch K1 are in a disengaged state. In a third axial position of the connecting shaft WV, the first clutch K0 is in a disengaged state, and the second clutch K1 is in an engaged state. In a fourth axial position of the connecting shaft WV, both the first clutch K0 and the second clutch K1 are in an engaged state.

Figure 1A:
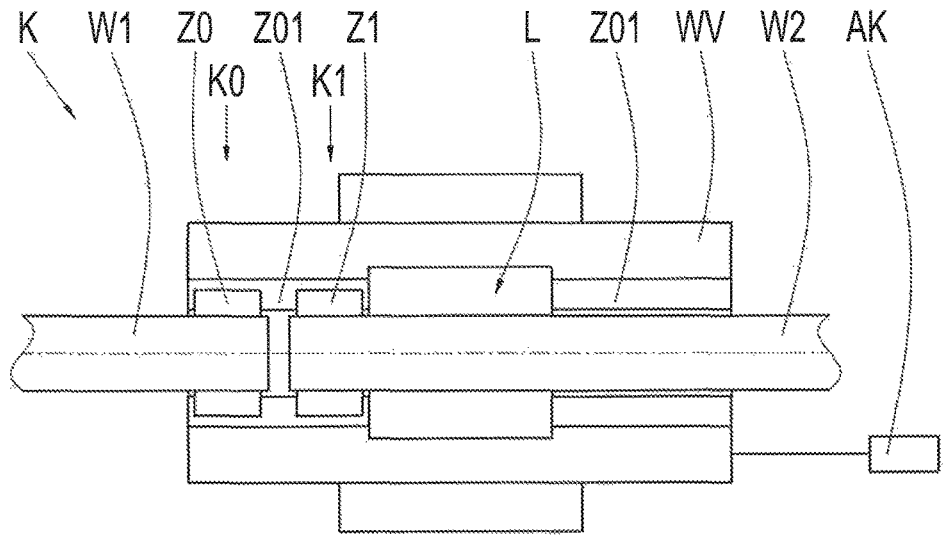

FIG. 1a shows the coupling device K in the fourth axial position of the connecting shaft WV. In this fourth position of the connecting shaft WV, the first claw toothing Z0 is overlapped with the third claw toothing Z01, and the second claw toothing Z1 is overlapped with the third claw toothing Z01. Thus, the first and second clutches K0, K1 are in an engaged state. Through the overlap, a torque-proof connection between the first shaft WI, the connecting shaft WV and the second shaft W2 is established.

Figure 1B:
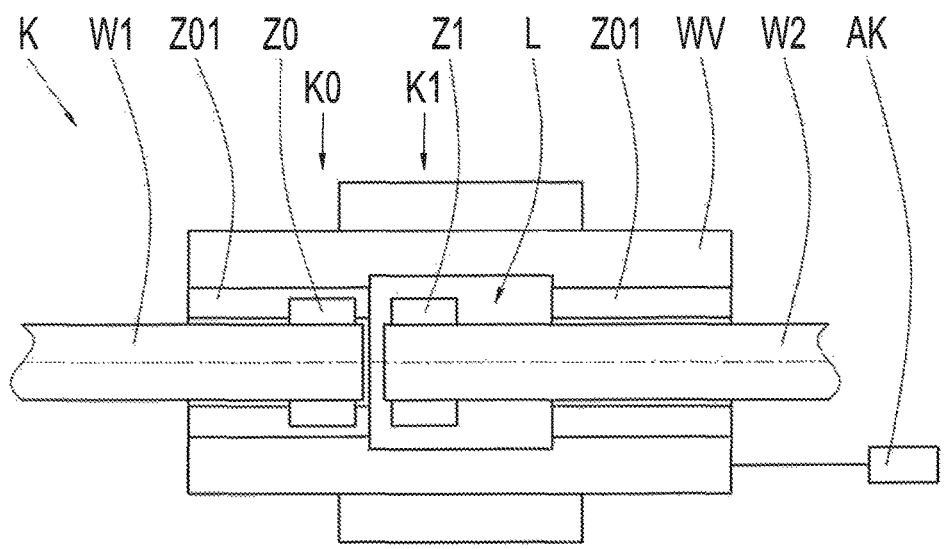

FIG. 1b shows the coupling device K in the first axial position of the connecting shaft WV. The first axial position of the connecting shaft WV is achieved through the axial displacement of the connecting shaft WV from the fourth axial position by means of the actuator AK. In the first axial position of the connecting shaft WV, only the first claw toothing Z0 is in overlap with the third claw toothing Z01, by which the first clutch K0 is in an engaged state. The second claw toothing Z1 is not engaged with the third claw toothing Z01, since the second claw toothing Z1 is spatially within the gap L of the third claw toothing Z01.

Figure 1C:
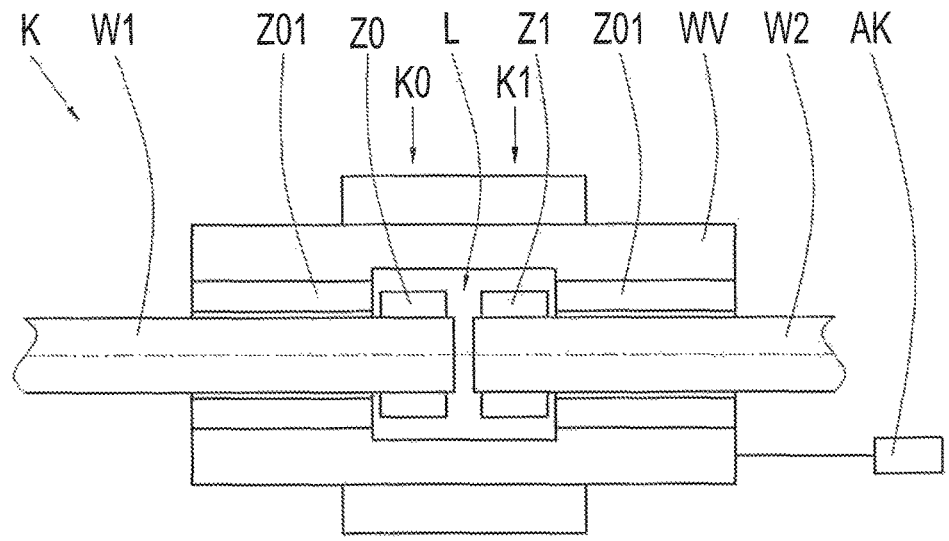

FIG. 1c shows the coupling device K in the second axial position of the connecting shaft WV. The second axial position of the connecting shaft WV is achieved through the axial displacement of the connecting shaft WV from the first axial position by means of the actuator AK. In the second axial position of the connecting shaft WV, both the first claw toothing Z0 and the second claw toothing Z1 are spatially located in the gap L of the third claw toothing Z01. Thereby, the first and second claw toothings Z0, Z1 are not engaged with the third claw toothing Z01. Thus, the first and second clutches K0, K1 are in a disengaged state.

Figure 1D:
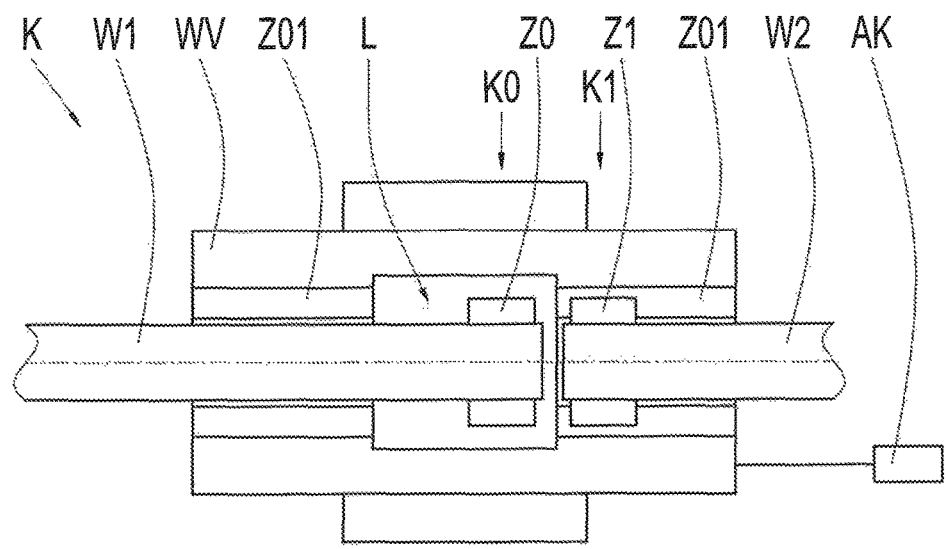

FIG. 1d shows the coupling device K in the third axial position of the connecting shaft WV. The third axial position of the connecting shaft WV is achieved through the axial displacement of the connecting shaft WV from the second axial position by means of the actuator AK. In the third axial position of the connecting shaft WV, the first claw toothing Z0 is still spatially within the gap L of the third claw toothing Z01, and therefore is not in engagement. The second claw toothing Z1 is once again engaged with the third claw toothing Z01, by which the second clutch K1 is in an engaged state.

In accordance with the design of the coupling device K presented in FIG. 1, through the axial displacement of the connecting shaft WV, the following sequence of the axial position of the connecting shaft WV can be achieved: fourth axial position, first axial position, second axial position, third axial position.

FIG. 2 schematically shows the coupling device K in four different positions according to a second sequence. FIG. 2a shows the coupling device K in the first axial position of the connecting shaft WV, and corresponds to the presentation in FIG. 1b. FIG. 2b shows the coupling device K in the second axial position of the connecting shaft WV, and corresponds to the presentation in FIG. 1c. FIG. 2c shows the coupling device K in the third axial position of the connecting shaft WV, and corresponds to the presentation in FIG. 1d. FIG. 2d shows the coupling device K in the fourth axial position of the connecting shaft WV, whereas the fourth axial position is achieved through another absolute axial position of the connecting shaft WV, as in the presentation in FIG. 1a. The fourth axial position of the connecting shaft WV is achieved through the axial displacement of the connecting shaft WV by means of the actuator AK, starting from the third axial position.

Starting from the third axial position of the connecting shaft WV shown in FIG. 1d, through the further axial displacement of the connecting shaft WV, a fifth axial position of the connecting shaft WV, in which both the first clutch K0 and the second clutch K1 are in an engaged state, can also be achieved. This state of the coupling device K is shown in FIG. 2d.

Figure 2A:
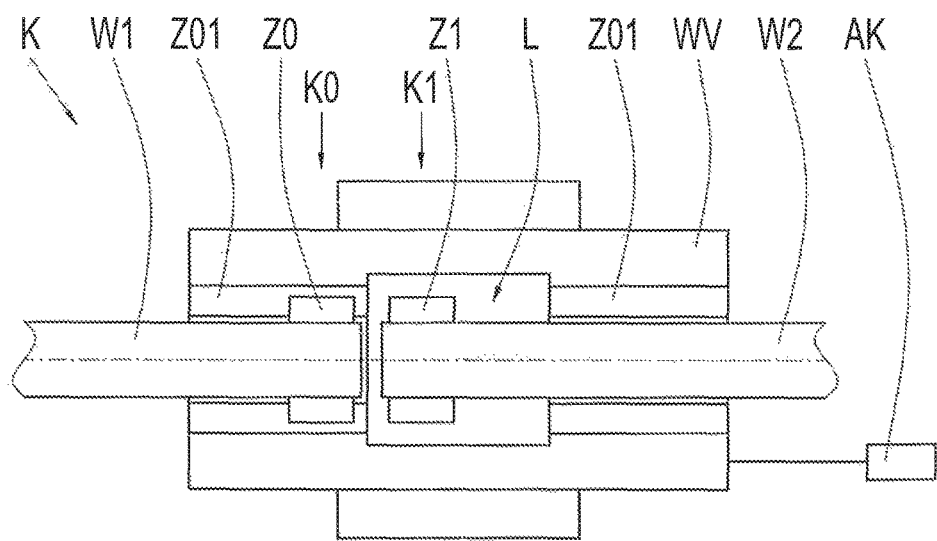
Figure 2B:
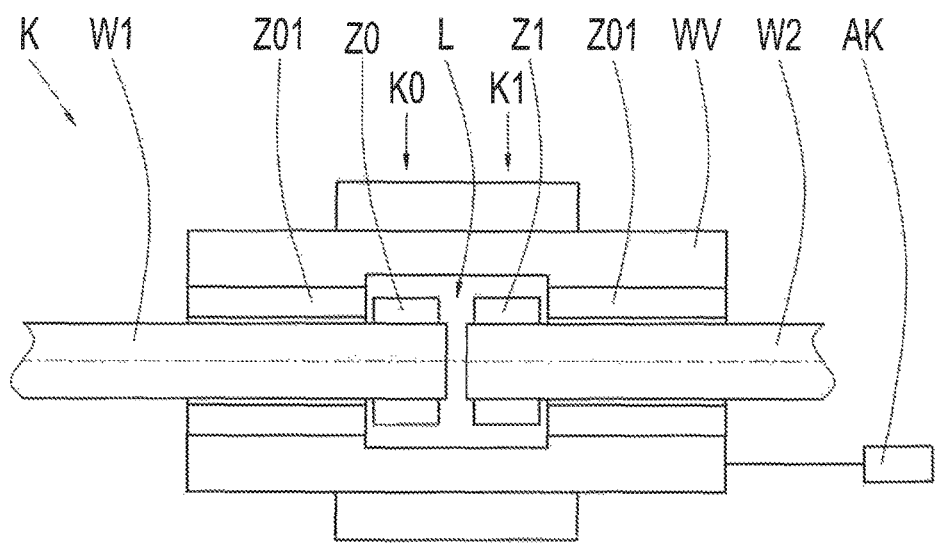
Figure 2C:
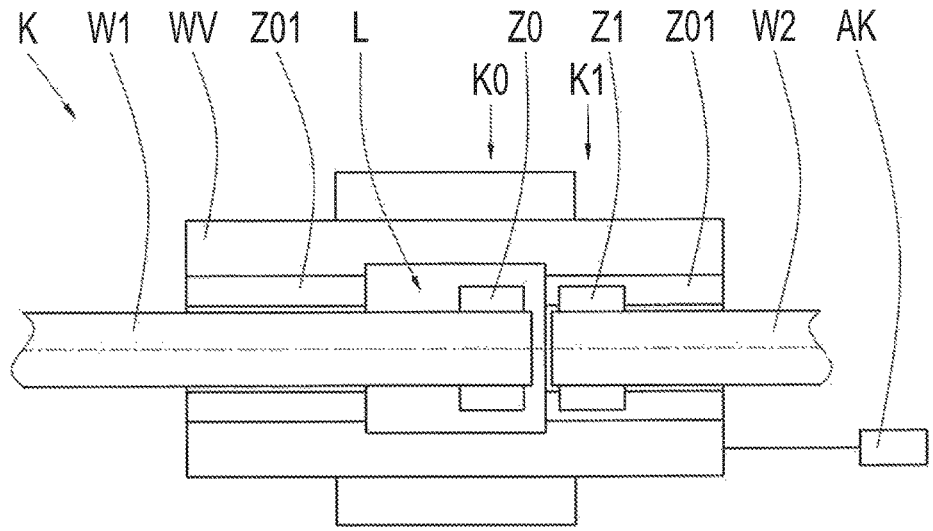
Figure 2D:
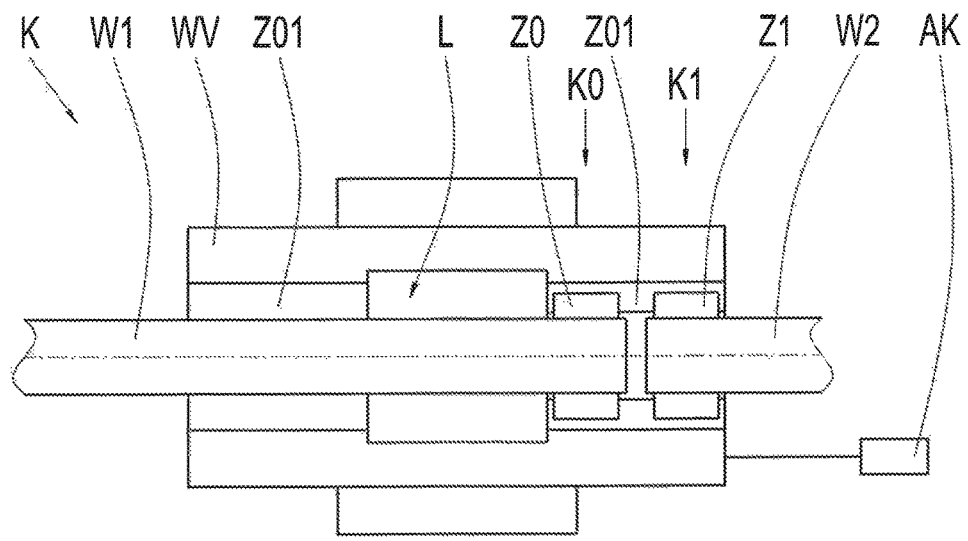

Starting from the first position of the connecting shaft WV shown in FIG. 2a, through the further axial displacement of the connecting shaft WV, the fifth axial position of the connecting shaft WV according to the presentation in FIG. 1a can be achieved. In such a manner, in the outermost position of the connecting shaft WV, both the first clutch K0 and the second clutch K1 would be in an engaged state.

FIG. 3 schematically shows a coupling device K of a second arrangement in three different positions according to a first sequence. The coupling device K according to the second arrangement features a third positive-locking clutch K2, which is configured to establish a torque-proof connection between the connecting shaft WV and a third shaft W3. For this purpose, a fourth claw toothing Z2-1 is formed at the outer diameter of the connecting shaft WV and a fifth claw toothing Z2-2 is formed at an inner diameter of the third shaft W3. Slide bearings GL are arranged between the connecting shaft WV and the third shaft W3. The slide bearings GL enable radial support of the third shaft W3 at the connecting shaft WV, whereas the axial displacement of the connecting shaft WV to the third shaft W3 remains ensured.

Figure 3A:
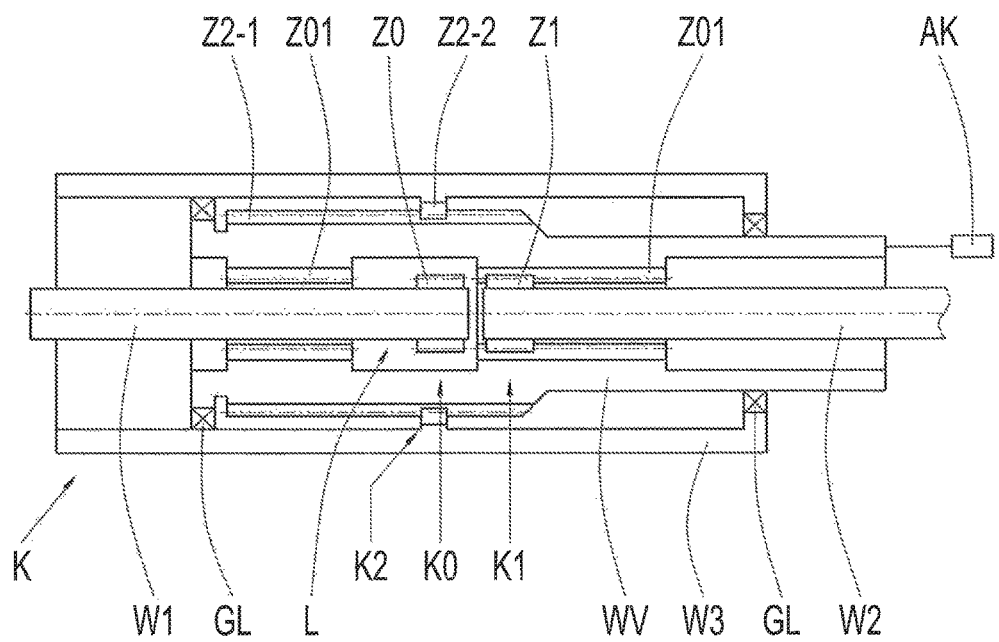
Figure 3B:
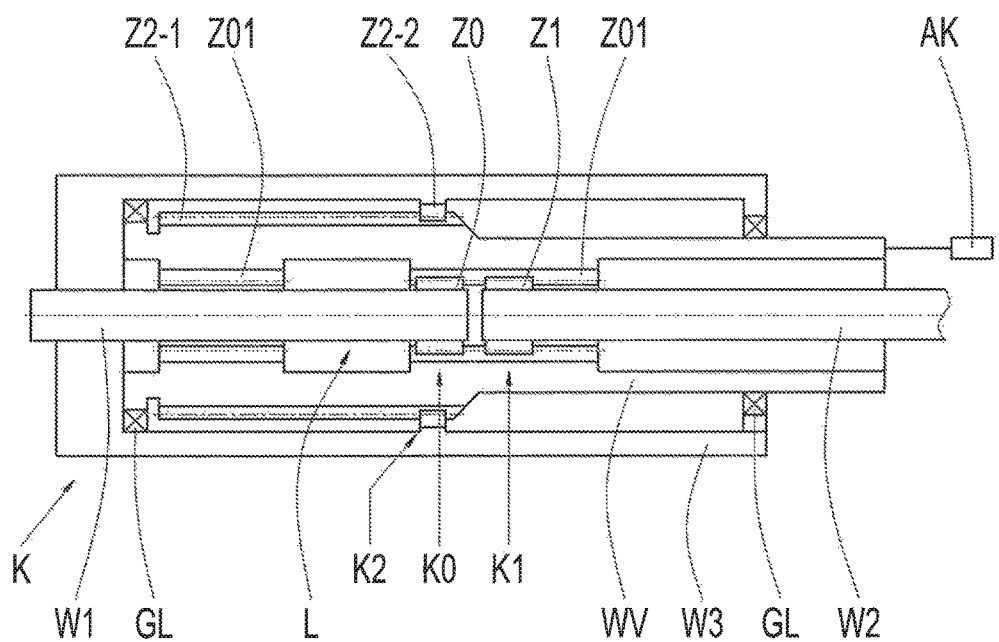
Figure 3C:
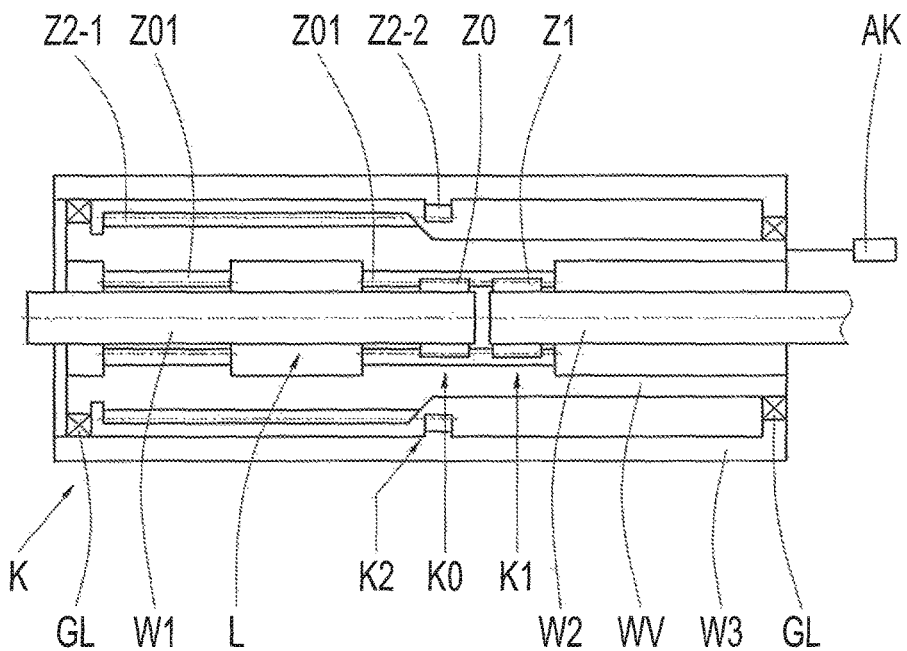

FIG. 3a shows the coupling device K according to the second arrangement in the third axial position of the connecting shaft WV. In the third axial position of the connecting shaft WV, the first claw toothing Z0 is spatially within the gap L of the third claw toothing Z01, and therefore is not in engagement. The second claw toothing Z1 is engaged with the third claw toothing Z01, by which the second clutch K1 is in an engaged state. The fourth claw toothing Z2-1 is engaged with the fifth claw toothing Z2-2, by which the third clutch K2 is in an engaged state. FIG. 3b shows the coupling device K according to the second arrangement in the fourth axial position of the connecting shaft WV, whereas the third clutch K2 is still in an engaged state. FIG. 3c shows the coupling device K according to the second arrangement in a sixth axial position of the connecting shaft WV. In this sixth axial position, the third clutch K2 is in a disengaged state. Therefore, there is no torque-proof connection between the connecting shaft WV and the third shaft W3. The first and second axial positions of the connecting shaft WV and, if applicable, the fifth axial position would also be selectable; however, for the sake of clarity, such positions are not depicted.

Figure 4A:
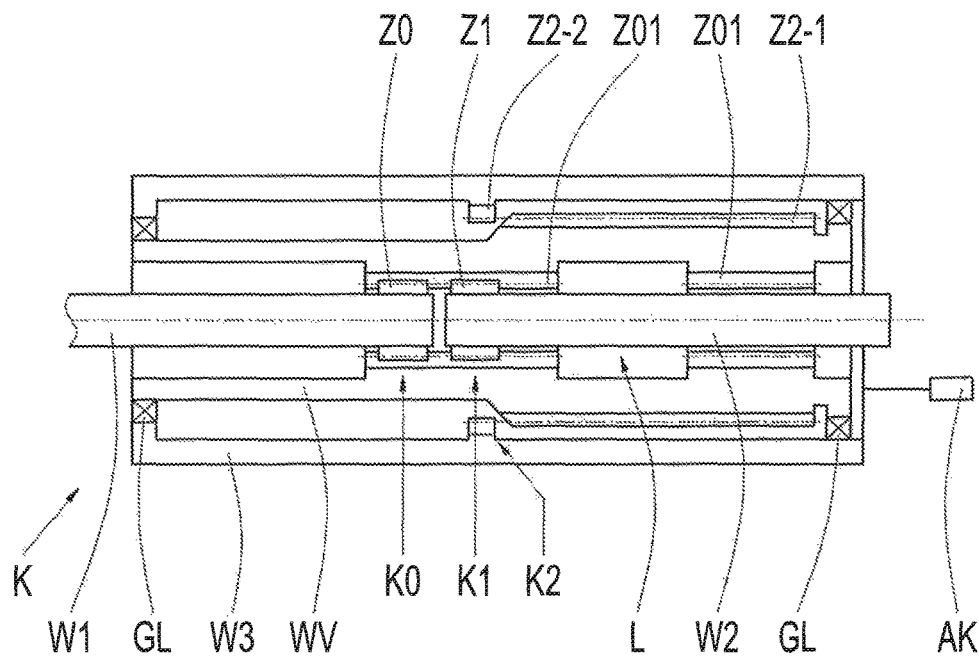
Figure 4B:
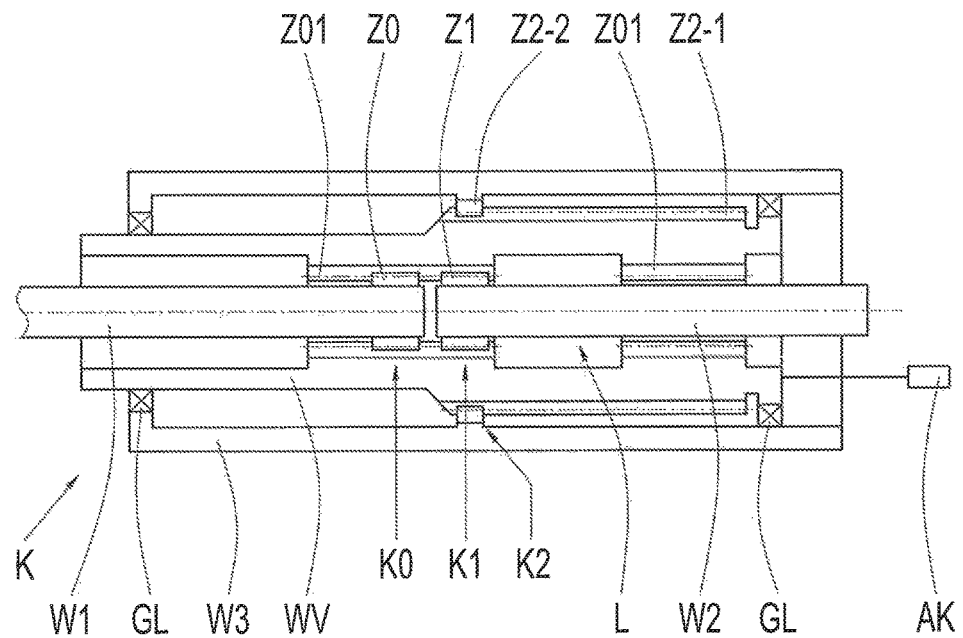
Figure 4C:
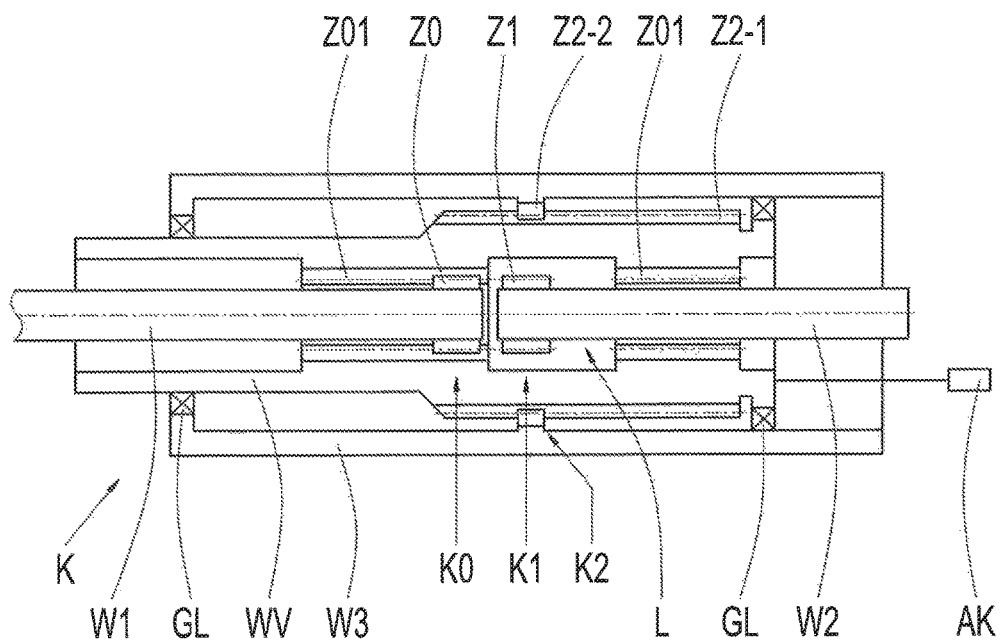

FIG. 4 schematically shows a coupling device K of the second arrangement in three different positions according to a second sequence. FIG. 4a shows the coupling device K in the sixth axial position of the connecting shaft WV. The third clutch K2 is in a disengaged state. In FIG. 4b, the connecting shaft WV is in its fourth axial position. The third clutch K2 is in an engaged state. Through the further displacement of the connecting shaft WV by the actuator AK, the connecting shaft WV is brought into its first axial position, which is shown in FIG. 4c. The third clutch K2 is still in an engaged state. The second and third axial positions of the connecting shaft WV and, if applicable, the fifth axial position would also be selectable; however, for the sake of clarity, such positions are not depicted.

Figure 5:
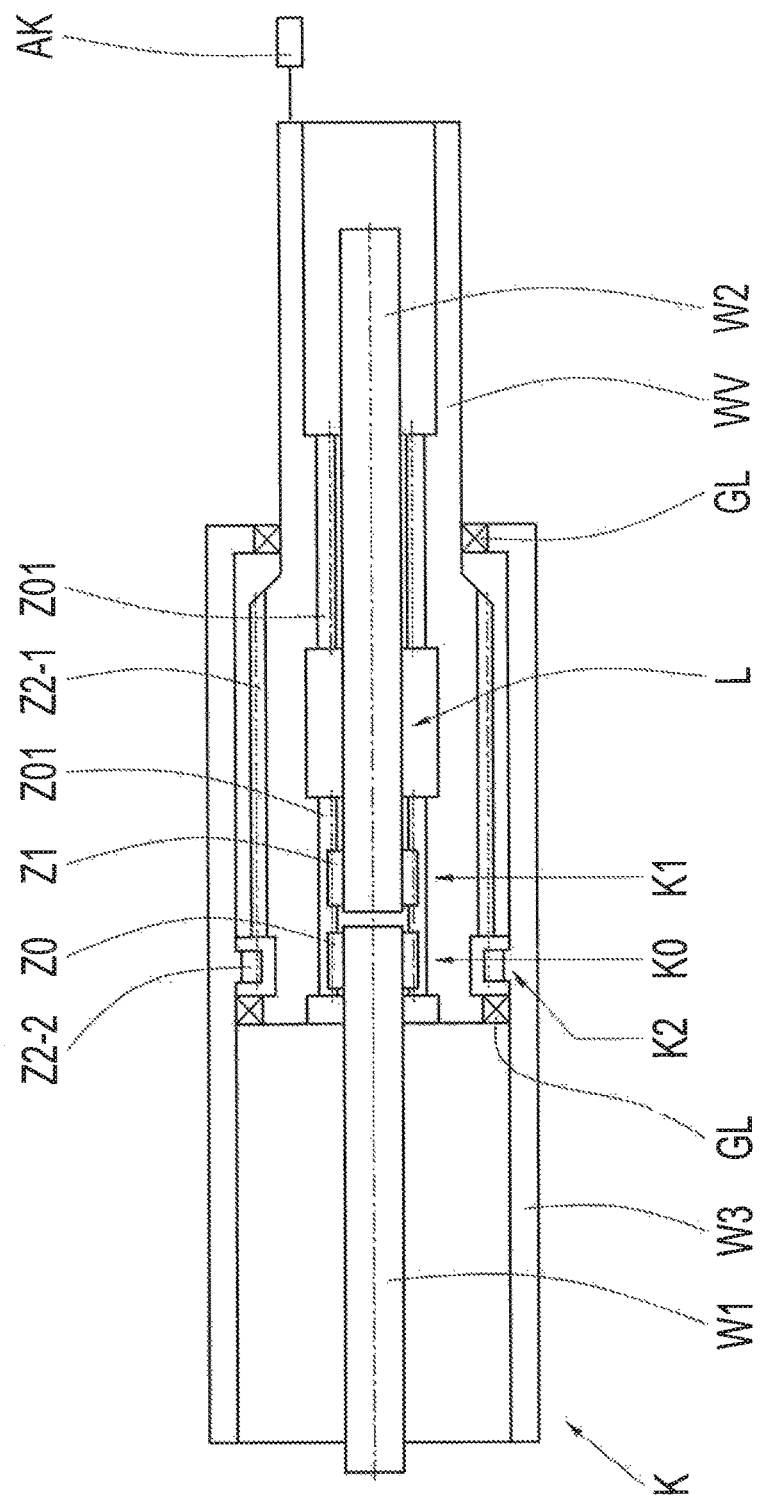

FIG. 5 schematically shows a coupling device K of a third arrangement. In this third arrangement, a seventh axial position of the connecting shaft WV is selectable; in this position, the third clutch K2 is in a disengaged state.

Figure 6:
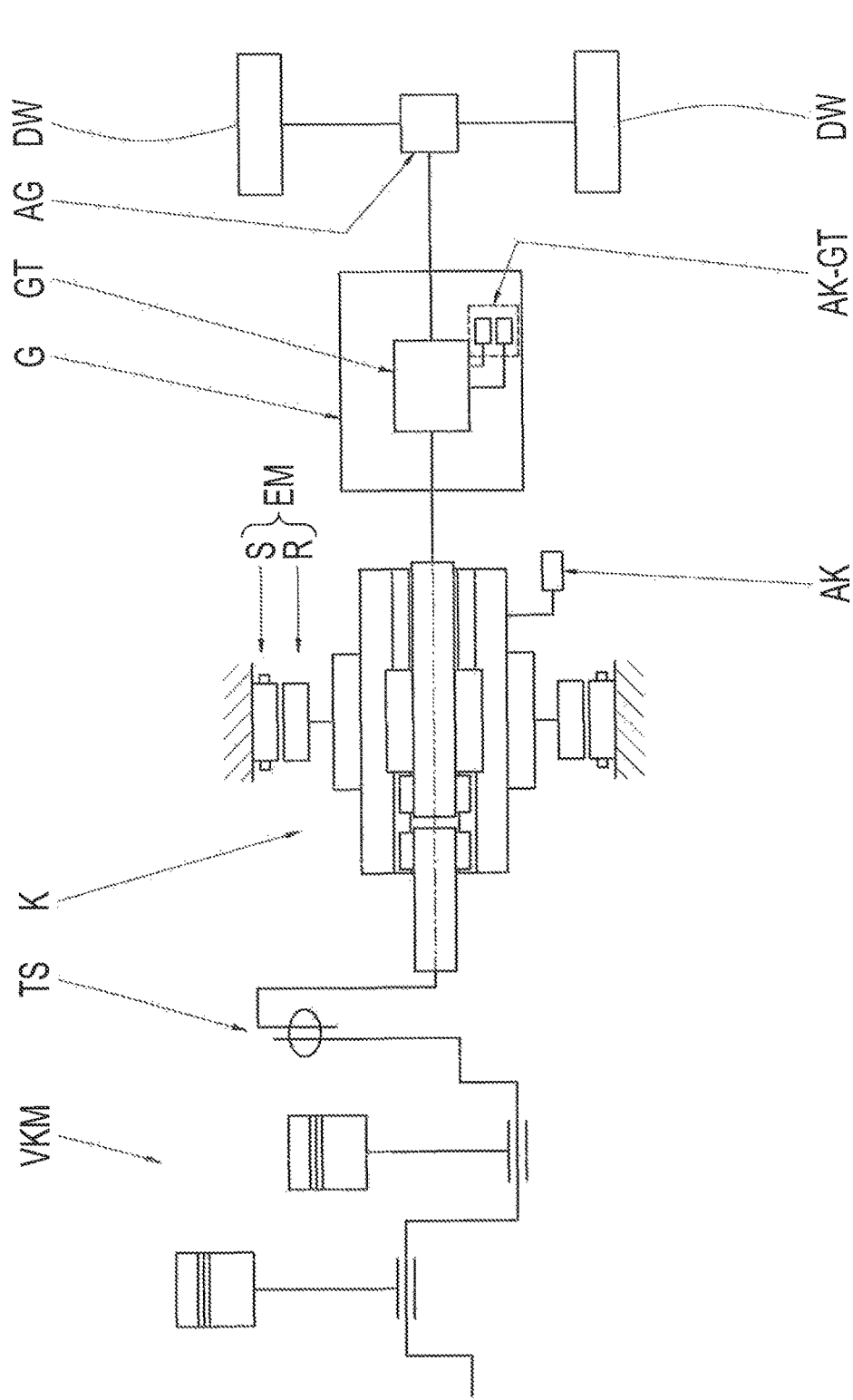
FIG. 6 shows a drive train of a hybrid vehicle according to a first embodiment.

FIG. 6 shows a drive train of a hybrid vehicle according to a first embodiment. A drive assembly VKM, which is formed for example as an internal combustion engine, is connected through a torsional vibration damper TS to the first shaft W1 of the coupling device K. The drive train features an electric motor EM with a torque-proof stator S and a rotatable rotor R, which is connected in a torque-proof manner to the connecting shaft WV. The rotor R is preferably firmly fixed in an axial manner. The axial displacement is realized, for example, through a synchronization toothing (not shown). The second shaft W2 of the coupling device K is connected to an input shaft of a transmission G, which forms an interface to a change of transmission ratio section GT of the transmission G. An output shaft of the transmission G is connected to an axle drive AG, which distributes the drive power to the gears DW of the hybrid vehicle. The change of transmission ratio section GT features a multitude of shifting elements, of which at least some are operated by an actuator system AK-GT.

Figure 7:
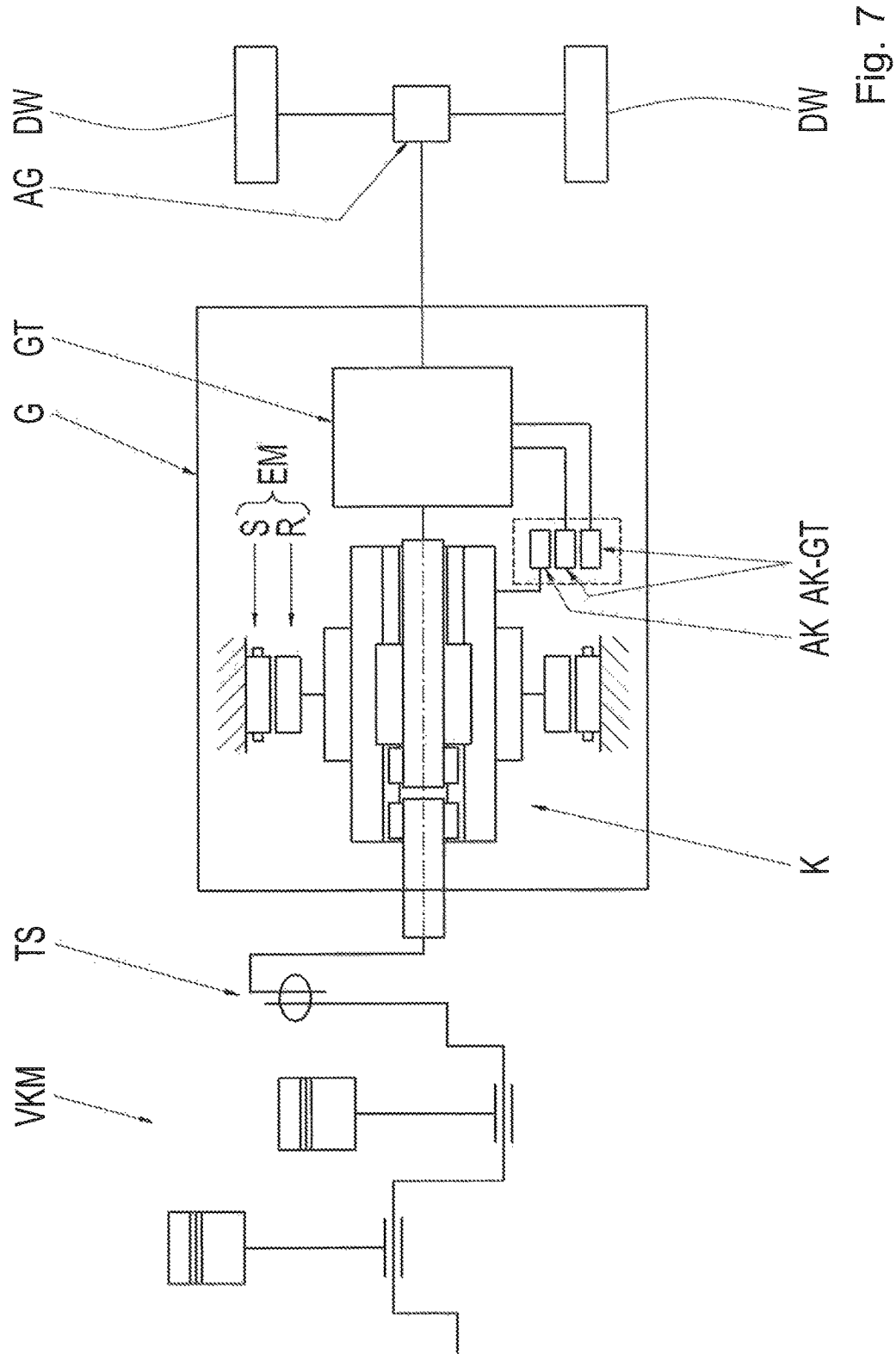
FIG. 7 shows a drive train of a hybrid vehicle according to a second embodiment.

FIG. 7 shows a drive train of a hybrid vehicle according to a second embodiment. Therein, the coupling device K is formed as a component of the transmission G. The actuator of the coupling device K and the actuator system AK-GT of the shifting elements of the change of transmission ratio section GT are arranged in such a manner that an operative connection of the two actuator systems is enabled.

FIG. 8 shows a drive train of a hybrid vehicle according to a third embodiment. As in the second embodiment, the coupling device K is formed as a component of the transmission G; however, it comprises the coupling device K according to the second arrangement. Accordingly, the rotor R is constantly connected in a torque-proof manner to the third shaft W3 of the coupling device.

FIG. 9 shows a sectional view of an exemplary automatic transmission AG for a motor vehicle, whereas only one half of the sectional view is shown. The automatic transmission AG features a multitude of planetary gear sets with several drive shafts, including a first transmission shaft GW1, a second transmission shaft GW2 and a third transmission shaft GW3. In addition, the automatic transmission AG features the coupling device K, whereas the first shaft W1 is constantly connected in a torque-proof manner to the first transmission shaft GW1, the second shaft W2 is constantly connected in a torque-proof manner to the second transmission shaft GW2 and the third shaft W3 is constantly connected in a torque-proof manner to the third transmission shaft GW3. The actuator AK is configured to axially displace the connecting shaft WV, by which the coupling device K occupies different axial positions.

In an alternative embodiment (not shown), the third transmission shaft GW3 may be connected in a torque-proof manner to the connecting shaft WV instead of the third shaft W3. Preferably, a suitable mechanism is thereby provided, through which the rotational movement of the third transmission shaft GW3 can be transmitted to the connecting shaft WV and, at the same time, a balance between the axially displaceable position of the connecting shaft WV and the axially fixed third transmission shaft GW3 is enabled.

REFERENCE SIGNS

K Coupling device
K0 First clutch
K1 Second clutch
K2 Third clutch
W1 First shaft
W2 Second shaft
W3 Third shaft
WV Connecting shaft
AK Actuator
Z0 First claw toothing
Z1 Second claw toothing
Z01 Third claw toothing
Z2-1 Fourth claw toothing
Z2-2 Fifth claw toothing
L Gap
GL Slide bearings
EM Electric motor
R Rotor
S Stator
G Transmission
GT Change of transmission ratio section of the transmission
AK-GT Actuator system of the transmission shifting elements
VKM Drive assembly
TS Torsional vibration damper
AG Axle drive
DW Gear
AG Automatic transmission

The invention claimed is:
1. A coupling device (K), comprising:
a first positive-locking clutch (K0);
a second positive-locking clutch (K1);
an axially fixed first shaft (W1);
an axially fixed second shaft (W2);
a connecting shaft (WV);
an actuator (AK);
the first shaft (W1), the second shaft (W2), and the connecting shaft (WV) arranged coaxially to each other such that:
by closing the first clutch (K0), a torque-proof connection between the first shaft (W1) and the connecting shaft (WV) is established;
by closing the second clutch (K1), a torque-proof connection between the connecting shaft (WV) and the second shaft (W2) is established;

the actuator (AK) configured to, through axial displacement of the connecting shaft (WV), shift both the first clutch (K0) and the second clutch (K1) between an engaged state and a disengaged state, wherein:

in a first axial position of the connecting shaft (WV), the first clutch (K0) is in an engaged state and the second clutch (K1) is in a disengaged state;

in a second axial position of the connecting shaft (WV), both the first clutch (K0) and the second clutch (K1) are in a disengaged state; and in a third axial position of the connecting shaft (WV), the first clutch (K0) is in a disengaged state and the second clutch (K1) is in an engaged state, in a fourth axial position of the connecting shaft (WV), both the first clutch (K0) and the second clutch (K1) are in an engaged state;

wherein through the axial displacement of the connecting shaft (WV), the following sequences of the axial positions of the connecting shaft (WV) are achieved:

(a) fourth axial position, first axial position, second axial position, third axial position, or (b) first axial position, second axial position, third axial position, fourth axial position.

2. The coupling device (K) according to claim 1, further comprising a first claw toothing (Z0) arranged at the first shaft (W1), a second claw toothing (Z1) arranged at the second shaft (W2), and a third claw toothing (Z01) arranged at the connecting shaft (WV), wherein:

in the first axial position of the connecting shaft (WV), the third claw toothing (Z01) is only in engagement with the first claw toothing (Z0);

in the second axial position of the connecting shaft (WV), the third claw toothing (Z01) is not in engagement with either the first or the second claw toothing (Z0, Z1);

in the third axial position of the connecting shaft (WV), the third claw toothing (Z01) is in engagement only with the second claw toothing (Z1); and in the fourth axial position of the connecting shaft (WV), the third claw toothing (Z01) is in engagement with both the first and the second claw toothings (Z0, Z1).

3. The coupling device (K) according to claim 2, wherein the third claw toothing (Z01) comprises a gap (L), wherein in the second axial position of the connecting shaft (WV), both the first claw toothing (Z0) and the second claw toothing (Z1) are spatially located in the gap (L) and are not in engagement with the third claw toothing (Z01).

4. The coupling device (K) according to claim 2, wherein in a fifth axial position of the connecting shaft (WV), both the first clutch (K0) and the second clutch (K1) are in an engaged state, the third claw toothing (Z01) is engaged with the first and second claw toothings (Z0, Z1), and, through the axial displacement of the connecting shaft (WV), the following sequence of the axial positions of the connecting shaft (WV) are achieved: fourth axial position, first axial position, second axial position, third axial position, fifth axial position.

5. The coupling device (K) according to claim 1, wherein the connecting shaft (WV) is connected in a torque-proof manner to an axially fixed third shaft (W3) through a third positive-locking clutch (K2).

6. The coupling device (K) according to claim 5, wherein the connecting shaft (WV) features a fourth claw toothing (Z2-1) and the third shaft (W3) features a fifth claw toothing (Z2-2), and wherein in the first to fifth axial position of the connecting shaft (WV), the fourth claw toothing (Z2-1) is in engagement with the fifth claw toothing (Z2-2) and, in a sixth axial position of the connecting shaft (WV), the fourth claw toothing (Z2-1) is not in engagement with the fifth claw toothing (Z2-2).

7. The coupling device (K) according to claim 6, wherein through the axial displacement of the connecting shaft (WV), one of the following sequences of the axial positions of the connecting shaft (WV) is achieved:

sixth axial position, fourth axial position, first axial position, second axial position, third axial position;

first axial position, second axial position, third axial position, fourth axial position, sixth axial position;

fifth axial position, first axial position, second axial position, third axial position, fourth axial position, sixth axial position; or sixth axial position, fifth axial position, first axial position, second axial position, third axial position, fourth axial position.

8. The coupling device (K) according to claim 7, wherein in a seventh axial position of the connecting shaft (WV), the fourth claw toothing (Z2-1) is not in engagement with the fifth claw toothing (Z2-2), and through the axial displacement of the connecting shaft (WV), the following sequence of the axial positions of the connecting shaft (WV) is achieved: seventh axial position, fifth axial position, first axial position, second axial position, third axial position, fourth axial position, sixth axial position.

9. The coupling device (K) according to claim 6, wherein the connecting shaft (WV) is formed as a hollow shaft, the third claw toothing (Z01) is formed as an internal toothing, and the fourth claw toothing (Z2-1) is formed as an external toothing.

10. The coupling device (K) according to claim 6, further comprising slide bearings (GL) arranged between the third shaft (W3) and the connecting shaft (WV).

11. The coupling device (K) according to claim 1, wherein the actuator (AK) comprises an electromechanical device.

12. The coupling device (K) according to claim 11, wherein transfer of the axial movement of the actuator (AK) to the connecting shaft (WV) takes place with a shift rod and a shift fork, or a shift drum and a shift fork.

13. A drive train of a motor vehicle, comprising:
a coupling device (K) according to claim 5;
an electric motor (EM) with a torque-proof stator (S) and a rotatably mounted rotor (R);
a drive assembly (VKM);
a transmission (G);
the first shaft (W1) connected through a torsional vibration damper (TS) in a torsionally flexible manner to the drive assembly (VKM);
the second shaft (W2) connected to a shaft of the transmission (G) in a torque-proof or torsionally flexible manner to form an interface to a change of transmission ratio section (GT) of the transmission (G); and
the rotor (R) of the electric motor (EM) constantly connected in a torque-proof manner either to the connecting shaft (WV) or to the third shaft (W3).

14. The drive train for a motor vehicle according to claim 13, wherein the coupling device (K) is a component of the transmission (G).

15. A transmission (G) for a motor vehicle, comprising:
a coupling device (K) according to claim 5;
an electric motor (EM) with a torque-proof stator (S) and a rotatably mounted rotor (R);
a drive assembly (VBKM);

the first shaft (W1) connected to a first shaft of the transmission (G) in a torque-proof or torsionally flexible manner to form an interface to the drive assembly (VKM);

the second shaft (W2) connected to a second shaft of the transmission (G) in a torque-proof or torsionally flexible manner to form an interface to a change of transmission ratio section (GT) of the transmission (G); and the rotor (R) of the electric motor (EM) constantly connected in a torque-proof manner either to the connecting shaft (WV) or to the third shaft (W3).

16. The transmission (G) for a motor vehicle according to claim 15, wherein:

the change of transmission ratio section (GT) comprises a multitude of shifting elements, selective actuation of which brings about a change in the transmission ratio relationship between the first and second shafts of the transmission (G); and the actuator (AK) in operative connection with an actuator system (AK-GT) for actuation of the first, second and third clutches (K0, K1, K2) to affect the change of transmission ratio section (GT).

17. The transmission (G) for a motor vehicle according to claim 15, wherein:

the first shaft (W1) is connected in a torque-proof manner to a first transmission shaft (GW1);

the second shaft (W2) is connected in a torque-proof manner to a second transmission shaft (GW2); and the third shaft (WV) is connected in a torque-proof manner to a third transmission shaft (GW3).

\* \* \* \* \*